US009967225B2

(12) United States Patent
Singh (10) Patent No.: US 9,967,225 B2
(45) Date of Patent: May 8, 2018

(54) CONNECTING A SEEKER GROUP MEMBER TO A TARGET ENTITY THROUGH CONNECTED GROUP MEMBERS WITHOUT COMPROMISING THEIR PRIVACY

(71) Applicant: Rachna Singh, Mumbai (IN)

(72) Inventor: Rachna Singh, Mumbai (IN)

(73) Assignee: HACHI LABS, INC., San Ramon, CA (US)

( * ) Notice: Subject to any disclaimer, the term of this patent is extended or adjusted under 35 U.S.C. 154(b) by 201 days.

(21) Appl. No.: 15/134,851

(22) Filed: Apr. 21, 2016

(65) Prior Publication Data

US 2016/0315903 A1   Oct. 27, 2016

(30) Foreign Application Priority Data

Apr. 21, 2015 (IN) ............................ 2047/CHE/2015

(51) Int. Cl.
*H04L 12/58* (2006.01)
*G06Q 50/00* (2012.01)
*G06Q 10/10* (2012.01)

(52) U.S. Cl.
CPC ........... *H04L 51/32* (2013.01); *G06Q 10/105* (2013.01); *G06Q 50/01* (2013.01)

(58) Field of Classification Search
CPC ....... H04L 51/32; G06Q 10/105; G06Q 50/01
See application file for complete search history.

(56) References Cited

U.S. PATENT DOCUMENTS

| 7,489,783 B2* | 2/2009 | Enokida | H04L 63/0442 380/278 |
| 2008/0126378 A1* | 5/2008 | Parkinson | G06F 21/33 |
| 2012/0215848 A1* | 8/2012 | McCormick | G06Q 10/10 709/204 |
| 2013/0179237 A1* | 7/2013 | Hull | H04L 51/28 705/12 |

* cited by examiner

*Primary Examiner* — Arvin Eskandarnia
(74) *Attorney, Agent, or Firm* — Roy L. Chan, A Professional Law Corp.

(57) ABSTRACT

A method for connecting a seeker group member to one or more target entities through a network server is provided. The method includes the following steps: (a) receiving a requirement from the seeker group member, (b) obtaining a group associated with the seeker group member, (c) obtaining a list of group members associated with the group, (d) querying contacts of the group members based on the requirement to obtain one or more matching target entities, (e) identifying one or more connected members who are already connected to the one or more matching target entities, (f) communicating a search result to each of the one or more connected members, (g) receiving a response selected from an acceptance or a rejection, (h) communicating referrals from the one or more connected members to the seeker group member, and (i) communicating introductory messages for connecting the matching target entities and the seeker group member through the connected members.

7 Claims, 9 Drawing Sheets

| SEEKER GROUP MEMBER 306 | TARGET ENTITY 308 | GROUP1 302A | GROUP MEMBERS 304A | GROUP 2 302B | GROUP MEMBERS 304B | GROUP 3 302C | GROUP MEMBERS 304C |
|---|---|---|---|---|---|---|---|
| JOHN BLOGGS | WILLIAM SMITH | ENTER-PRISE | JOHN DOE | MANUFA-CTURING | JOHN DOE | SALES | JOHN SMITH |
| | | | JANE DOE | | JANIE DOE | | RICHARD DOE |
| | | | JANE ROE | | JOHNY DOE | | ROBERT DOE |

FIG. 3A

| GROUP MEMBERS 304A-C | NETWORK1 310A | NETWORK2 310B | NETWORK3 310C |
|---|---|---|---|
| JOHN DOE | JAMES | MARK | ANDREW |
| JANE DOE | MATTHEW | CHRIS | SHAUN |
| JANE ROE | WILLIAM SMITH | STEVE | WILLIAM SMITH |
| JONNIE DOE | MICHAEL | FRANCIS | DAVID |
| JANNIE DOE | ADAM | DANIEL | AUSTIN |
| JOHNY DOE | RICHE | DAMIEN | SHANE |
| JOHN SMITH | GEORGE | GLENN | BRAD |
| RICHARD DOE | TOM | JONATHAN | KEVIN |
| ROBERT DOE | TIM | ROGER | MOSES |
| STEPHEN DOE | NATHAN | MARSHAL | CLIVE |

Hi John Doe —504

ABC is hiring a mobile developer. We found 5 mobile developers in your network who match the profile. The referral reward is $500.

You can refer candidates by clicking below. And, we will let the hiring manager at ABC know that your referred these candidates 1) Abraham Murray —502A
Google | Harvard University Scitute. Massachusetts [REFER]

2) Cindy Muya —502B
Google | Stanford University | San Jose, California [REFER]

3) Jeff Chan —502C
General Dynamics Carnegie Mellon University San Jose . California, [REFER]

4) Praveen Kumar —502D
Independent Contractor | Carnegie Mellon University (Pittsburgh Campus) [REFER]

5) Deepak Alur —502E
Jack Be Corporation St. Michael School Fremont. California [REFER]

Mobile developer: 79 Candidates referred by your group members

1) Abraham Murray —502A
Google I Harvard University Scitute. Massachusetts

Referred by John Doe

[Accept referral]

2) Deepak Kumar —602A
Jack Be Corporation St. Michael School Fremont. California Referred by Samantha Shapiro

[Accept Referral]

3) Jeff Riche —602B
General Dynamics Carnegie Mellon University San Jose . California, Referred by Jane Yang

[Accept Referral]

FIG. 6

To   abraham@email.com

Cc   geoff@abc-email.com   johndoe@email.com

From Network server

---

Intro – Abraham – Geoff (re: Mobile Developer role at ABC)

Hi Geoff

I am connecting you with my friend, Abraham Murray, for the mobile developer role at ABC.

Please Contact him for further discussion.

Best regards,
John Doe

CONNECTING A SEEKER GROUP MEMBER TO A TARGET ENTITY THROUGH CONNECTED GROUP MEMBERS WITHOUT COMPROMISING THEIR PRIVACY

CROSS-REFERENCE TO RELATED APPLICATIONS

This application claims priority to Indian patent application no. 2047/CHE/2015 filed on Apr. 21, 2015, the provisional disclosure of which, in its entirely, is herein incorporated by reference.

BACKGROUND

Technical Field

The embodiments herein generally relate to a system and method for connecting a seeker group member to one or more target entities, and more particularly to a system and method for connecting a seeker group member to one or more target entities without compromising privacy of members of a group associated with the seeker group member.

Description of the Related Art

An entity (e.g., an organization, a person, etc.) has a requirement to connect with other entities that are not directly known to them for business as well as social reasons. Typically, a seeker entity may connect with a target entity by sending a communication (e.g., a connection request on a social network, an email, a message, etc.) on one or more communication platforms (e.g., email providers, social networks, messaging services, internet telephony service providers, online communities, forums, etc.). Typically people become members of multiple communication platforms depending upon their personal and business interests. An average internet savvy person carrying one or more internet connected devices is a member of at least five communication platforms.

Existing social networks and platforms may typically permit a seeker entity to directly perform a search to find relevant group members who can refer the target entity. Hence, the seeker member may be able to not only view a list of matching target entities but also see which connected members and how the connected members are connected to the target entities, provided the connected member is a member of the same group as the seeker member. However, most group members do not prefer to share their detailed network connections data, as it reveals their personal or business relationship information and compromises their privacy. Thus, existing networks fail to get sufficient participation from group members to refer target entities due to privacy concerns.

For example, a seeker entity (e.g., a sales person from an enterprise ABC), may want to connect with a target entity (e.g., a CEO). With existing approaches, the first entity gets access to the information including (i) members of the enterprise ABC, and (ii) each member's connections across multiple networks. The first entity then searches, and finds members from the enterprise ABC who can refer the second enterprise. However, privacy of the members of the enterprise ABC is compromised since the members' connections across networks are shared with the seeker entity.

Also, even when the seeker entity's group members want to help the seeker entity with referrals, it is difficult and time consuming for the group members to perform multiple searches within their networks to find out whom in their network matches a need of the seeker entity. Accordingly, there remains a need for a system and method for connecting target entities with seeker entities belonging to a group without compromising the privacy of members of the group connected to the target entities.

SUMMARY

In view of the foregoing, an embodiment herein provides a network server system for connecting a seeker group member to a target entity. The network server system includes (a) a memory unit, and (b) a processor. The memory unit stores (i) a set of modules, (ii) a group database that stores groups associated with one or more users and members of each of the groups, and (iii) a network database that stores contacts of members of each of the groups across multiple networks. The processor executes the set of modules. The set of modules includes a requirement receiving module, a group identifying module, a group member retrieving module, a multiple network query module, a connected group members identifying module, a message communicating module, a referral consent module, a referral communicating module, and an entity connecting module.

The requirement receiving module, implemented by the processor, obtains a requirement to connect from a seeker group member. The group identifying module, implemented by the processor, identifies a group that is associated with the seeker group member based on login credentials of the seeker group member. The group member retrieving module, implemented by the processor, searches the group database that stores the groups associated with the one or more users and members of each of the groups, and retrieves group members associated with the group that are associated with the seeker group member. The multiple network query module, implemented by the processor, searches contacts of the group members across multiple networks obtained from the network database, and identifies one or more contacts that match the requirement as one or more target entities.

The connected group members identifying module, implemented by the processor, identifies one or more connected members connected to the one or more of target entities. The message communicating module, implemented by the processor, communicates one or more messages to each of the connected members. The one or more messages include a first message to a first connected member, and a second message to a second connected member. The first message includes one or more first target entities from a network of the first connected member which matches the requirements, and the second message includes a one or more second target entities from a network of the second connected member which matches the requirements.

The referral consent module, implemented by the processor, processes a response from the connected member to accept or reject the referral. The referral communicating module, implemented by the processor, communicates referrals of the one or more target entities from the connected member. The entity connecting module, implemented by the processor, generates and communicates an introductory message for connecting the one or more target entities and the seeker group member, upon the connected member accepting to refer the one or more of target entities.

In one embodiment, the group database and the network database are regularly updated for existing user information, and information associated with one or more new users. In another embodiment, user information is stored in the group database and the network database is inaccessible by the seeker group member. In yet another embodiment, the requirement is provided as a multimedia text.

In another aspect, a network server system for connecting a seeker group member to a target entity is provided. The network server system includes (a) a memory unit, and (b) a processor. The memory unit stores (i) a set of modules, (ii) a group database that stores groups associated with one or more users and members of each of the groups, and (iii) a network database that stores contacts of members of each of the groups across multiple networks. The group database and the network database are regularly updated for existing user information, and information associated with one or more new users. The user information is stored in the group database and the network database is inaccessible by the seeker group member. The processor executes the set of modules. The set of modules includes a requirement receiving module, a group identifying module, a group member retrieving module, a multiple network query module, a connected group members identifying module, a message communicating module, a referral consent module, a referral communicating module, and an entity connecting module.

The requirement receiving module, implemented by the processor, obtains a requirement to connect from a seeker group member. The requirement is provided as a multimedia text. The group identifying module, implemented by the processor, identifies a group that is associated with the seeker group member based on login credentials of the seeker group member. The group member retrieving module, implemented by the processor, searches the group database that stores the groups associated with the one or more users and members of each of the groups, and retrieves group members associated with the group that are associated with the seeker group member. The multiple network query module, implemented by the processor, searches contacts of the group members across multiple networks obtained from the network database, and identifies one or more contacts that match the requirement as one or more target entities.

The connected group members identifying module, implemented by the processor, identifies one or more connected members connected to the one or more target entities. The message communicating module, implemented by the processor, communicates one or more messages to each of the connected members. The one or more messages include a first message to a first connected member, and a second message to a second connected member. The first message includes one or more first target entities from a network of the first connected member which matches the requirements, and the second message includes a one or more second target entities from a network of the second connected member which matches the requirements.

The referral consent module, implemented by the processor, processes a response from the connected member to accept or reject the referral. The referral communicating module, implemented by the processor, communicates referrals of the one or more target entities from the connected member. The entity connecting module, implemented by the processor, generates and communicates an introductory message for connecting the one or more target entities and the seeker group member, upon the connected member accepting to refer the one or more target entities.

In one embodiment, the stored contacts of the group members across multiple networks are obtained from the network database.

In yet another aspect, a method of connecting a seeker group member to a target entity through a connected group is provided. The method includes the following steps: (a) receiving a requirement to connect from a seeker group member; (b) obtaining a group that is associated with the seeker group member; (c) obtaining a list of group members associated with the group; (d) querying contacts of the group members across multiple networks based on the requirement to obtain one or more matching target entities; (e) identifying one or more connected members who are already connected to the one or more matching target entities; (f) communicating a search result to each of the connected members. The search result includes the one or more of matching target entities connected to the seeker group member; (g) receiving a response selected from an acceptance or a rejection from the one or more connected members to refer the one or more matching entities to the seeker group member; (h) communicating referrals from the one or more connected members to the seeker group member only when the response is the acceptance and not when the response is the rejection; and (i) communicating introductory messages for connecting the matching target entities and the seeker group member through the connected members.

BRIEF DESCRIPTION OF THE DRAWINGS

The embodiments herein will be better understood from the following detailed description with reference to the drawings, in which.

With reference to FIG. 5.

With reference to FIG. 5 and FIG. 6.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for connecting target entities with seeker entities belonging to a group without compromising the privacy of members of the group connected to the target entities. Embodiments herein achieve this providing a network server that maintains privacy of members of the group, and still connects the seeker group member to the target entity. Referring now to the drawings, and more particularly to FIGS. 1 through 8, where similar reference characters denote corresponding features consistently throughout the figures, there are shown preferred embodiments.

Figure 1:
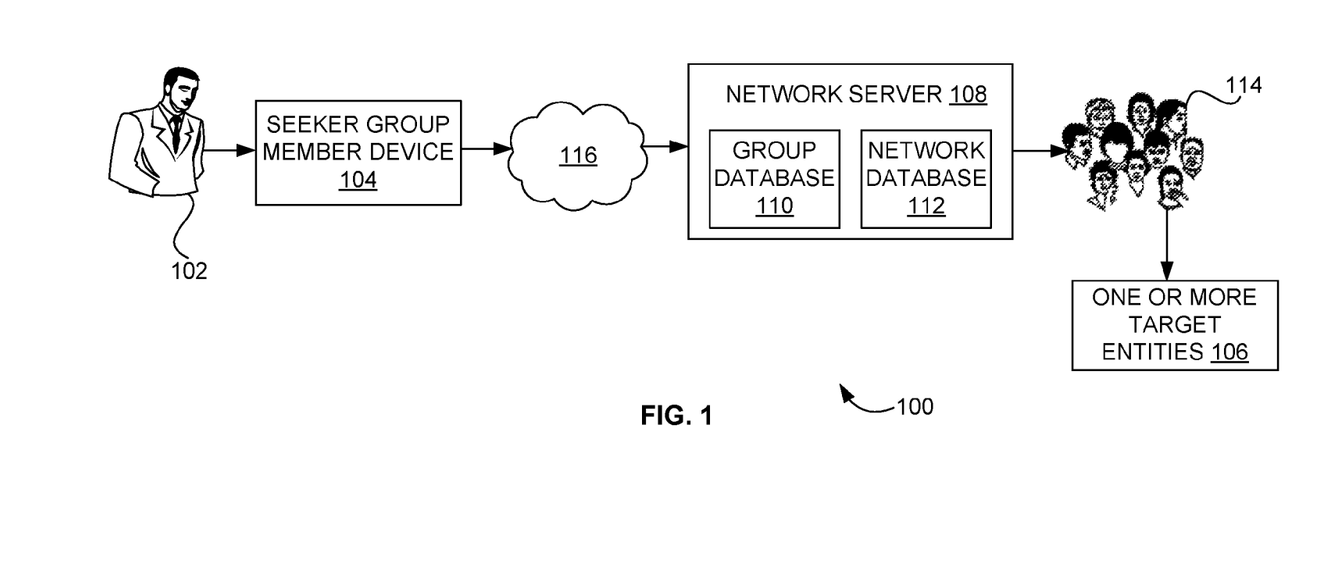
FIG. 1 illustrates a system view that includes a seeker group member communicating with a seeker group member device to connect with one or more target entities through a network server according to an embodiment herein.

FIG. 1 illustrates a system view 100 that includes a seeker group member 102 communicating with a seeker group member device to connect with one or more target entities 106 through a network server 108 according to an embodiment herein. The seeker group member 102 is a user who is seeking a connection with the one or more target entities 106. In one embodiment, the seeker group member 102 is associated with multiple groups across multiple networks. Examples of such networks include one or more social media sites, one or more community networks, and/or one or more offline networks. For instance, the seeker group member 102 is a member of an entrepreneur group, and a member of a sales person group in Facebook®. Likewise, the seeker group member 102 may also be a member of an enterprise in Google+®.

The seeker group member 102 provides his/her requirement using the seeker group member device 104. In one embodiment, the requirement is provided as multimedia text. The requirement may include a person name or an entity name with which the seeker group member wants to connect with, or a description which indicates the seeker group member's need. In one embodiment, the seeker group member device 104 is a computer, a mobile device, a smart phone, a tablet, a laptop, or a wearable device. In one embodiment, the seeker group member device 104 is connected to the network server 108 through a network 116.

The network server 108 includes a group database 110 and a network database 112. In one embodiment, the network server 108 is located remotely with respect to the seeker group member device 104. The group database 110 stores groups associated with a plurality of users, and/or members of each of those groups. The network database 112 stores contacts of members of each of the groups across multiple networks. The group database 110 and the network database 112 are regularly updated for existing user information, and information associated with a plurality of new users. In one embodiment, information stored in the group database 110 and the network database 112 is inaccessible by the seeker group member 102.

The network server 108 receives a requirement that is provided by the seeker group member 102 from the seeker group member device 104, and identifies or obtains a group of the seeker group member 102 through which he/she wants to connect with the one or more target entities 106. The network server 108 searches the group database 110 for group members of the identified group. The network server 108 also searches the network database 112, and identifies connected members 114 of the identified group who are connected to one or more target entities 106 that match with the requirement of the seeker group member 102. The network server 108 then communicates a message to each of the connected members 114. The message includes the one or more target entities 106 from a connected member's network which matches the requirement of the seeker group member 102.

When a connected member accepts to refer the one or more target entities 106 from his/her network which matches the requirement to the seeker group member 102, the network server 108 communicates referrals (of the one or more target entities 106) from the connected member to the seeker group member device 104. The network server 108 also generates an introductory message for connecting the one or more target entities 106 and the seeker group member 102, upon the connected member accepting to refer the one or more target entities 106.

Figure 2:
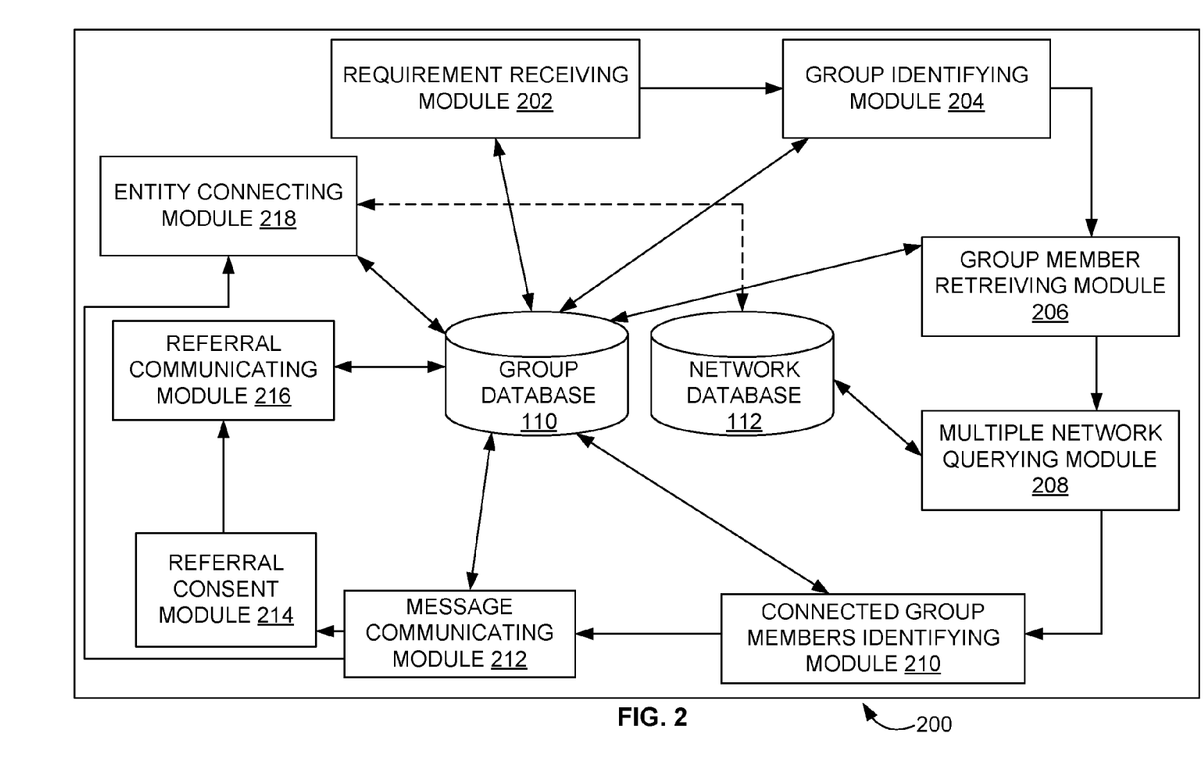
FIG. 2 illustrates an exploded view of the network server of FIG. 1 according to an embodiment herein.

FIG. 2 illustrates an exploded view 200 of the network server 108 of FIG. 1 according to an embodiment herein. The network server 108 includes the group database 110, the network database 112, a requirement receiving module 202, a group identifying module 204, a group member retrieving module 206, a multiple network query module 208, a connected group members identifying module 210, a message communicating module 212, a referral consent module 214, a referral communicating module 216, and an entity connecting module 218. The requirement receiving module 202 receives a requirement that is provided by the seeker group member 102 from the seeker group member device 104. The group identifying module 204 identifies a group associated with the seeker group member 102. In one embodiment, the group identifying module 204 identifies the group associated with the seeker group member 102 based on login credentials.

In another embodiment, the group identifying module 204 identifies the group associated with the seeker group member 102 by processing a user input including a selection of the group. The group member retrieving module 206 searches the group database 110 that stores groups associated with a plurality of users and/or members of each of those groups, and retrieves group members associated with the group that is identified by the group identifying module 204.

The multiple network query module 208 searches contacts of the group members across multiple networks, and identifies one or more contacts that match the requirement as the one or more target entities 106. In one embodiment, contacts of the group members across multiple networks are obtained from the network database 112. In another embodiment, contacts of the group members across multiple networks are obtained in real-time. The connected group members identifying module 210 identifies the one or more connected members 114 who are already connected to the one or more target entities 106.

The message communicating module 212 communicates a message to each of the connected members 114. The message includes the one or more target entities 106 from a connected member's network which matches the requirement. The referral consent module 214 processes a response from the connected member to accept or reject the referral. The referral communicating module 216 communicates referrals (of the one or more target entities 106) from the connected member to the seeker group member device 104. The entity connecting module 218 generates and communicates an introductory message for connecting the one or more target entities 106 and the seeker group member 102, upon the connected member accepting to refer the one or more target entities 106.

Figure 3A:
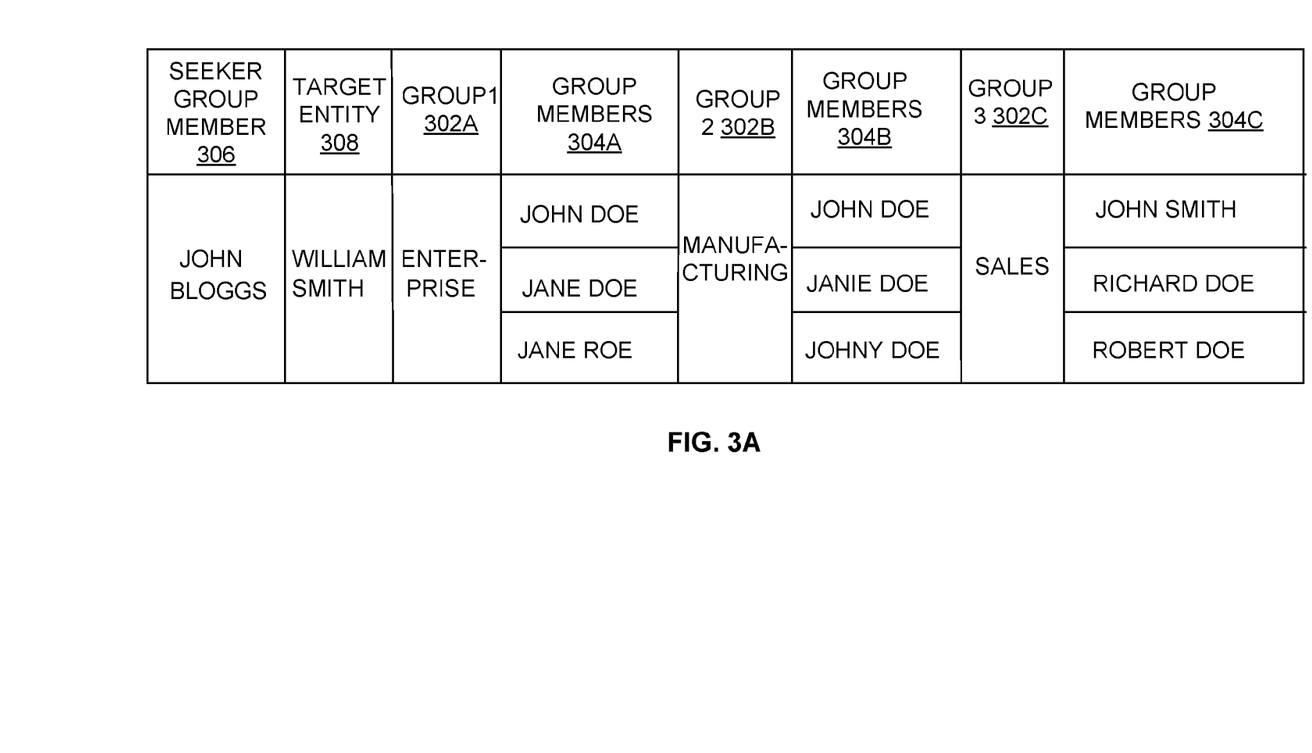
FIG. 3A is a table view illustrating groups associated with a user and group members associated with each of the groups stored in the group database of FIG. 1 according to an embodiment herein.

FIG. 3A is a table view illustrating groups 302A-C associated with a user and group members 304A-C associated with each of the groups 304A-C stored in the group database 110 of FIG. 1 according to an embodiment herein. FIG. 3A depicts data stored in the group database 110 for a particular user. Likewise, the group database 110 stores groups associated with a plurality of users and members of each of those groups. For instance, the user is a seeker group member 306 (e.g., John Blogs) who wants to connect with a target entity 308 (e.g., William Smith). The seeker group member 306 inputs a requirement which is of seeking a connection with the target entity 308. The requirement receiving module 202 receives the requirement that is provided by the seeker group member 306 from a seeker group member device. The group identifying module 204 searches the group database 110, and identifies one or more groups associated with the seeker group member 306. For example, the one or more groups are group1 302A which is an enterprise group, group2 302B which is a manufacturing group, and group3 302C which is a sales group.

The group member retrieving module 206 retrieves group members associated with one or more groups that are identified by the group identifying module 204. For instance, group members 304A associated with the group1 302A are "John Doe", "Jane Doe", and "Jane Roe". Group members 304B associated with the group2 302B are "Jonnie Doe", "Janie Doe", and "Johny Doe". Group members 304C associated with the group3 302C are "John smith", "Richard Doe", and "Robert Joe".

Figure 3B:
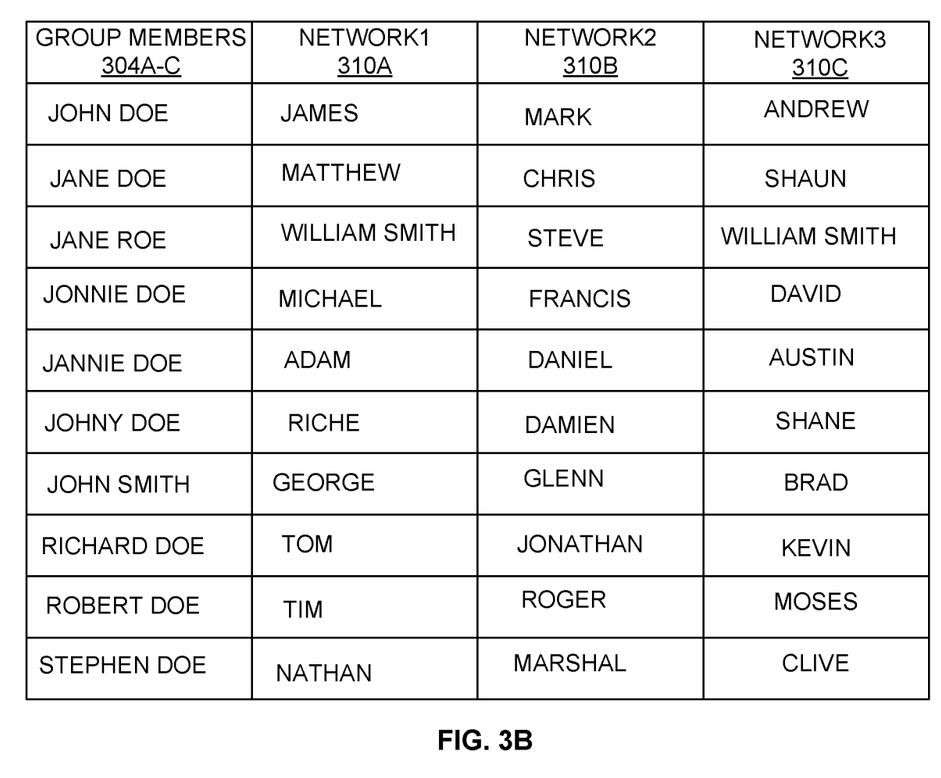
FIG. 3B is a table view illustrating contacts of the group members of FIG. 3A across multiple networks stored in the network database of FIG. 1 according to an embodiment herein.

FIG. 3B is a table view illustrating contacts of the group members 304A-C of FIG. 3A across multiple networks 310A-C stored in the network database 112 of FIG. 1 according to an embodiment herein. FIG. 3B depicts data stored in the network database 112 for the group members 304A-C. Likewise, the network database 112 stores contacts associated with members of various groups across multiple networks. The multiple network query module 208 searches contacts of members of at least one group from the group's 302A-C, and identifies a contact that matches the requirement as the target entity 308. The connected group members identifying module 210 identifies one or more connected members from a connection seeker's network who are already connected to the target entity 308. For instance, a connected member "Jane Roe" who is connected to the seeker group member "John Blogs" in the group1 302A, is also connected to a target entity "William Smith" in the network 310A.

The message communicating module 212 communicates a message to the connected member "Jane Roe". In one embodiment, the message indicates "William Smith" in your network matches the requirement of the seeker group member 306. The referral consent module 214 processes a response from the connected member to accept or reject the referral. The referral communicating module 216 communicates a referral ("William Smith") from the connected member "Jane Roe" to the seeker group member device 306, upon the connected member "Jane Roe" accepting to refer "William Smith" to "John Blogs". The entity connecting module 218 generates and communicates an introductory message to "John Blogs" for connecting "William Smith" and "John Blogs", upon "Jane Roe" accepting to refer "William Smith".

Figure 4:
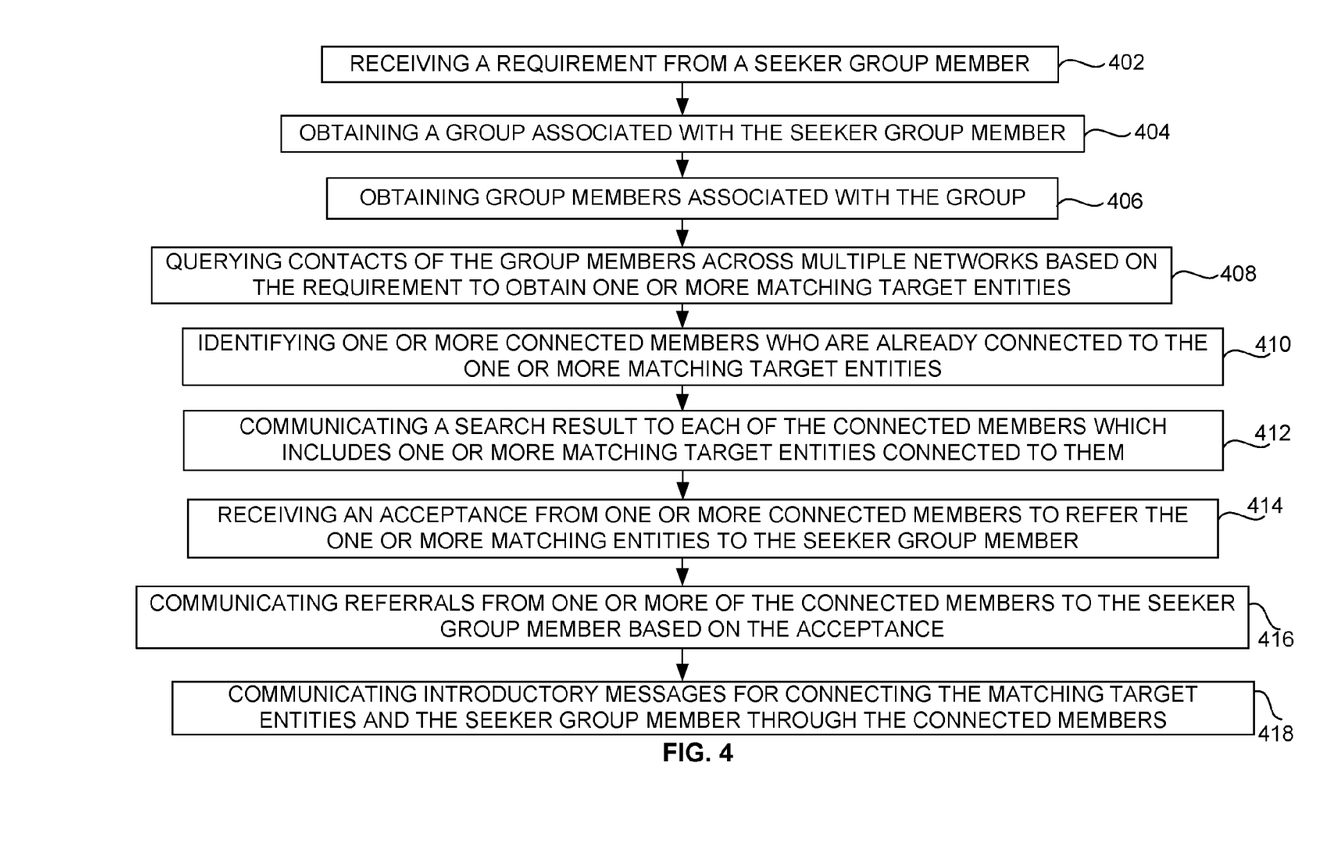
FIG. 4 is a flow diagram illustrating a method for connecting the seeker group member to the one or more target entities through the network server of FIG. 1 according to an embodiment herein.

FIG. 4 is a flow diagram illustrating a method for connecting the seeker group member 102 to the one or more target entities 106 through the network server 108 of FIG. 1 according to an embodiment herein. In step 402, a requirement is received from the seeker group member 102. In step 404, a group associated with seeker group member 102 is obtained. In step 406, group members associated with the group are obtained. In step 408, contacts of the group members across multiple networks are queried based on the requirement to obtain one or more matching target entities. In step 410, one or more connected members who are already connected to the one or more matching target entities are identified. In step 412, a search result is communicated to each of the one or more connected members (e.g., as shown in the FIG. 5). The search result includes the one or more matching target entities connected to the connected members. In step 414, an acceptance is received from the one or more connected members to refer the one or more matching entities to the seeker group member. In step 416, referrals from one or more of the connected members are communicated to the seeker group member 102 based on the acceptance (e.g., as shown in the FIG. 6). In step 418, introductory messages are communicated for connecting the matching target entities and the seeker group member 102 through the connected members (e.g., as shown in FIG. 7). In one embodiment, when the one or more connected members do not accept to refer the one or more matching entities to the seeker group member, referrals are not communicated to the seeker group member. Similarly, introductory messages are not communicated for connecting the matching target entities and the seeker group member 102 through the connected members.

Figure 5:
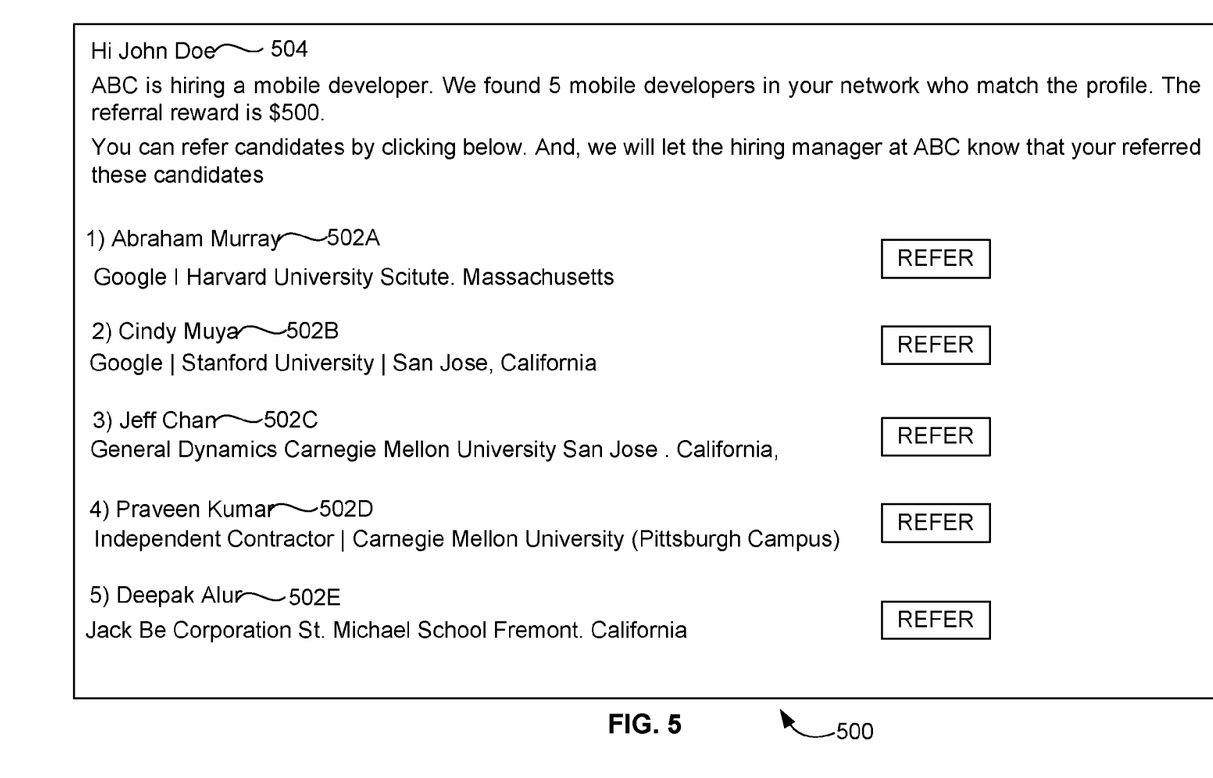
FIG. 5 is a user interface view illustrating a message that indicates target entities from a connected member's network that match a requirement of a seeker group member according to an embodiment herein.

FIG. 5 is a user interface view illustrating a message 500 that indicates target entities 502A-E from a connected member's 504 network that match a requirement of a seeker group member according to an embodiment herein. For example, a hiring manager (e.g., Geoff) of an enterprise is seeking connections with mobile developers for hiring process. The requirement receiving module 202 receives a requirement that includes connecting with mobile developers from the hiring manager, in one embodiment. The group identifying module 204 identifies a group associated with the hiring manager as the enterprise ABC, in one embodiment. The group member retrieving module 206 retrieves group members associated with the enterprise ABC, in one embodiment.

In one embodiment, the multiple network query module 208 searches contacts of members of the enterprise ABC across multiple networks, and identifies entities who match the requirement as target entities. For example, the multiple network query module 208 searches contacts of a connected member "John doe" who is a member of the enterprise ABC across multiple networks, and identifies entities 502A-E who are all mobile developers as target entities.

The connected group members identifying module 210 identifies connected members from the enterprise ABC who are already connected to such target entities (i.e., mobile developers), in one embodiment. The message communicating module 212 communicates a message to each of the connected members with a request for referral, in one embodiment. The message 500 is one such example message received by "John Doe". The message indicates target entities 502A-E from his network who matches the requirement of the hiring manager "Geoff". Similarly, other connected members of the enterprise ABC also receives similar message when they are connected to target entities who matches the requirement.

Figure 6:
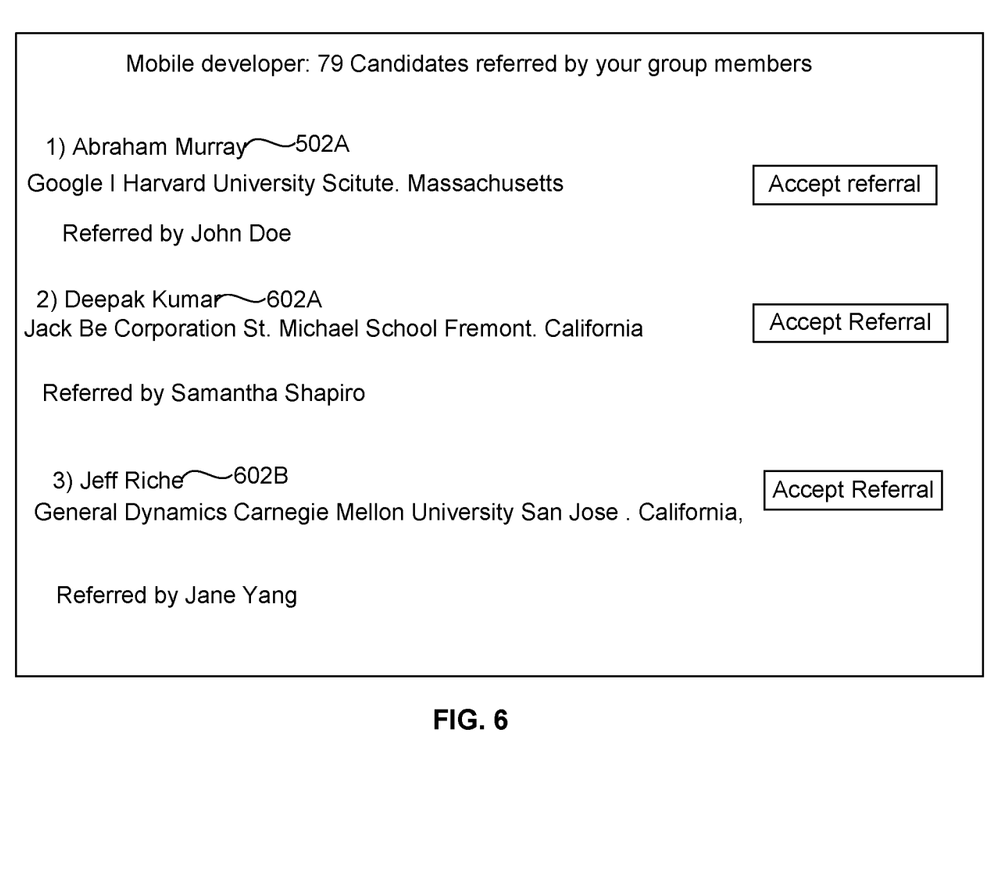
FIG. 6 is a user interface view illustrating target entities received as referrals from connected group members of an enterprise ABC according to an embodiment herein.
Figure 7:
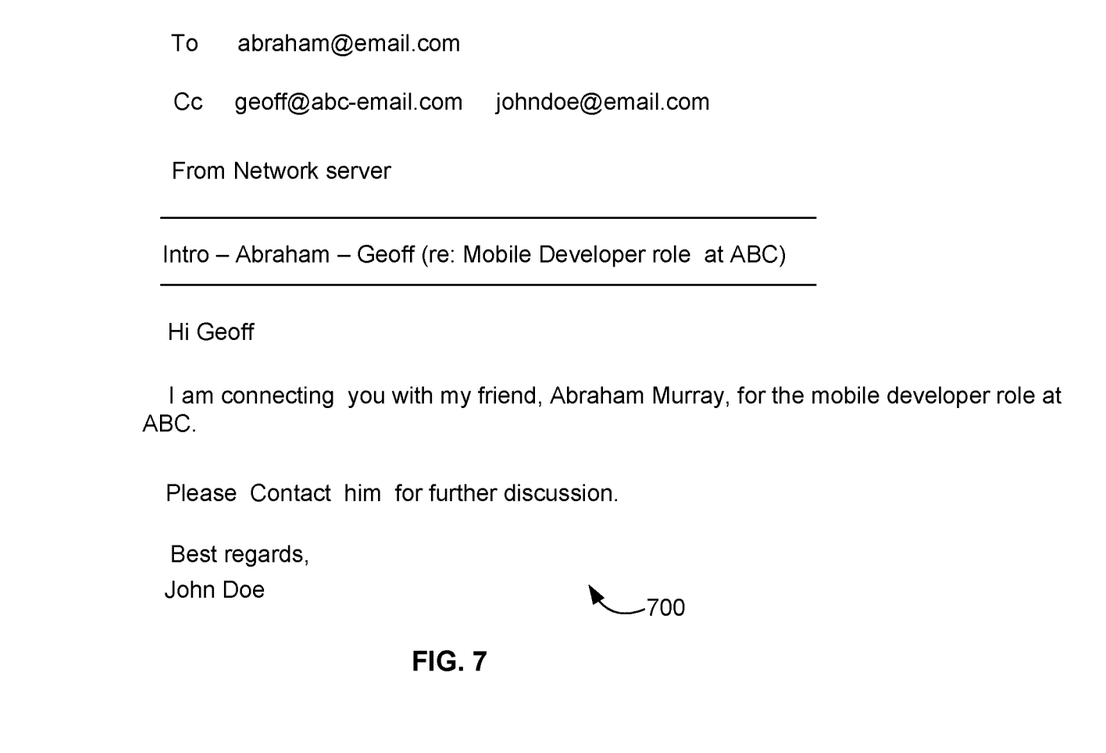
FIG. 7 is a user interface view illustrating an introductory message for connecting the seeker group member and the target entity according to an embodiment herein.

With reference to FIG. 5, FIG. 6 is a user interface view illustrating target entities received as referral from connected group members of the enterprise ABC according to an embodiment. Upon the connected member "John Doe" accepts to refer a target entity "Abraham Murray", the referral communicating module 216 communicates a referral ("Abraham Murray") from the connected member "John Doe" to the hiring manager "Geoff", as depicted in the FIG. 6 in one example embodiment. Similarly, the hiring manager receives other target entities (Deepak Kumar 602A and Jeff Riche 602B) as referrals from other connected members of the enterprise ABC.

With reference to FIG. 5 and FIG. 6, FIG. 7 is a user interface view illustrating an introductory message 700 for connecting the seeker group member 102 and the target entity 106 according to an embodiment herein. Upon the connected member "John Doe" accepts to refer a target entity "Abraham Murray", the entity connecting module 218 generates and communicates the introductory message 700 to the hiring manager "Geoff" and a target entity "Abraham Murray", and optionally to the connected member "John Doe", as depicted in the FIG. 7 in one example embodiment. FIG. 7 illustrates the introductory message 700 as an email, however it is understood by a person having ordinary skill in the art that the introductory message 700 can be in other forms that are known in the art such as via messages on social networks, messenger services, VOIP services, SMS etc.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
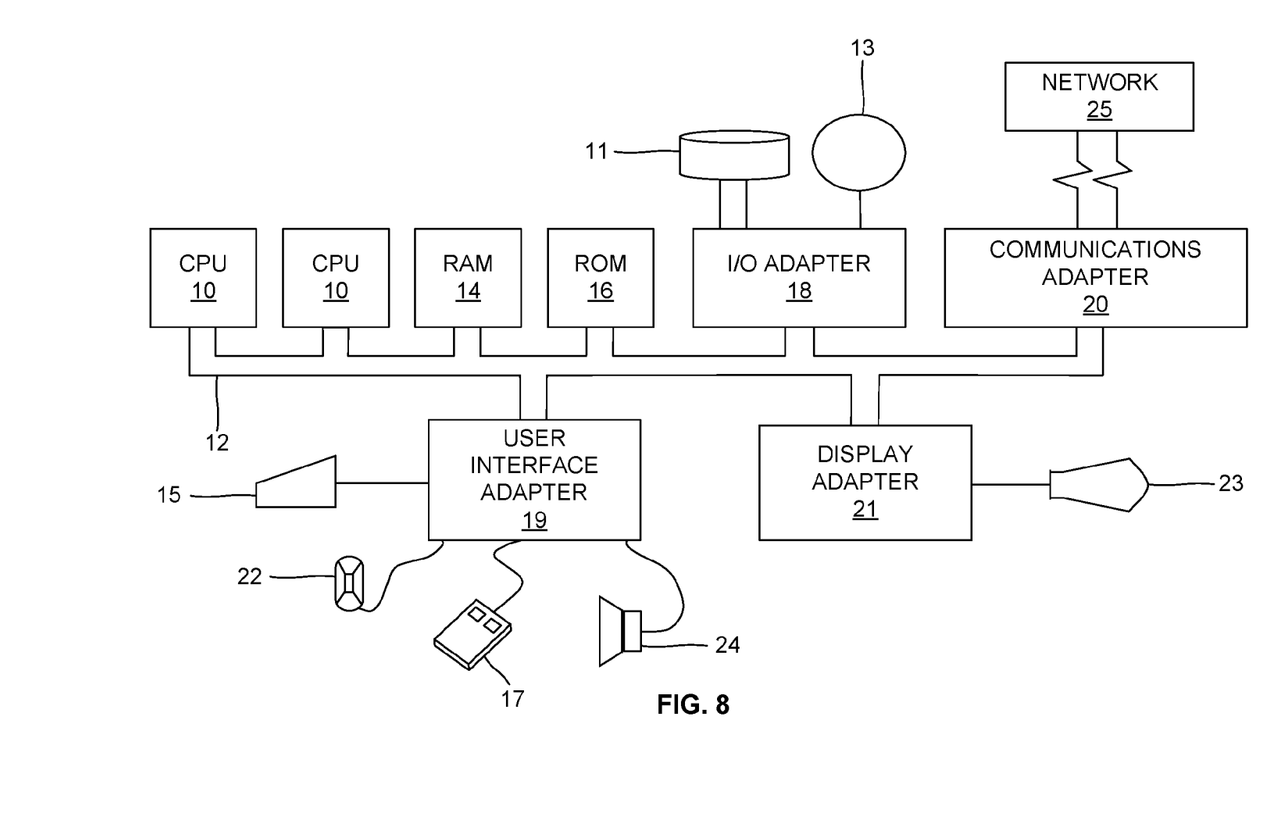
FIG. 8 illustrates a schematic diagram of a computer architecture according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A network server system of connecting a seeker group member to a target entity comprising:
   (a) a memory unit that stores (i) a set of modules, (ii) a group database that stores groups associated with a plurality of users and members of each of said groups, and (iii) a network database that store contacts of members of each of said groups across multiple networks; and
   (b) a processor that executes said set of modules, wherein said set of modules comprises:
      (i) a requirement receiving module implemented by said processor, that obtains a requirement to connect from a seeker group member;
      (ii) a group identifying module implemented by said processor, that identifies a group that is associated with said seeker group member based on login credentials of said seeker group member;
      (iii) a group member retrieving module implemented by said processor, that searches said group database that stores said groups associated with the plurality of users and members of each of said groups, and retrieves group members associated with said group that are associated with said seeker group member;
      (iv) a multiple network query module implemented by said processor, that searches contacts of said group members across multiple networks obtained from said network database, and identifies a plurality of contacts that match said requirement as a plurality of target entities;
      (v) a connected group members identifying module implemented by said processor that identifies a plurality of connected members connected to said plurality of target entities;
      (vi) a message communicating module implemented by said processor, that communicates a plurality of messages to each of said connected members, wherein said plurality of messages comprises a first message to a first connected member, and a second message to a second connected member, wherein said first message comprises a plurality of first target entities from a network of said first connected member which matches said requirements, and said second message comprises a plurality of second target entities from a network of said second connected member which matches said requirements;
      (vii) a referral consent module implemented by said processor, that processes a response from said connected member to accept or reject said referral;
      (viii) a referral communicating module implemented by said processor, that communicates referrals of said plurality of target entities from said connected member; and
      (ix) an entity connecting module implemented by said processor, wherein said entity connecting module that generates and communicates an introductory message for connecting said plurality of target entities and said seeker group member, upon said connected member accepting to refer said plurality of target entities.

2. The system for connecting a seeker group member to a target entity through connected group as claimed in claim 1, wherein said group database and said network database are regularly updated for existing user information, and information associated with a plurality of new users.

3. The system for connecting a seeker group member to a target entity through connected group as claimed in claim 1, wherein user information is stored in said group database and said network database is inaccessible by said seeker group member.

4. The system for connecting a seeker group member to a target entity through connected group as claimed in claim 1, wherein said requirement is provided as a multimedia text.

5. A network server system for connecting a seeker group member to a target entity comprising:
   (a) a memory unit that stores (i) a set of modules, (ii) a group database that stores groups associated with a plurality of users and members of each of said groups, and (iii) a network database that store contacts of members of each of said groups across multiple networks, wherein said group database and said network database are regularly updated for existing user information, and information associated with a plurality of new users, wherein user information is stored in said group database and said network database is inaccessible by said seeker group member; and
   (b) a processor that executes said set of modules, wherein said set of modules comprises:
      (i) a requirement receiving module implemented by said processor, that obtains a requirement to connect from a seeker group member, wherein said requirement is provided as a multimedia text;
      (ii) a group identifying module implemented by said processor, that identifies a group that is associated with said seeker group member based on login credentials of said seeker group member;
      (iii) a group member retrieving module implemented by said processor, that searches said group database that stores said groups associated with the plurality of users and members of each of said groups, and retrieves group members associated with said group that are associated with said seeker group member;
      (iv) a multiple network query module implemented by said processor, that searches contacts of said group members across multiple networks obtained from said network database, and identifies a plurality of contacts that match said requirement as a plurality of target entities;
      (v) a connected group members identifying module implemented by said processor that identifies a plurality of connected members connected to said plurality of target entities;
      (vi) a message communicating module implemented by said processor, that communicates a plurality of messages to each of said connected members, wherein said plurality of messages comprises a first message to a first connected member, and a second message to a second connected member, wherein said first message comprises a plurality of first target entities from a network of said first connected member which matches said requirements, and said second message comprises a plurality of second target entities from a network of said second connected member which matches said requirements;
      (vii) a referral consent module implemented by said processor, that processes a response from said connected member to accept or reject said referral;
      (viii) a referral communicating module implemented by said processor, that communicates referrals of said plurality of target entities from said connected member; and (ix) an entity connecting module implemented by said processor, wherein said entity connecting module that generates and communicates an introductory message for connecting said plurality of target entities and said seeker group member, upon said connected member accepting to refer said plurality of target entities.

6. The system for connecting a seeker group member to a target entity through connected group as claimed in claim 5, wherein said stored contacts of the group members across multiple networks are obtained from said network database.

7. The method of connecting a seeker group member to a target entity through a connected group, said method comprising:

receiving a requirement to connect from a seeker group member;

obtaining a group that is associated with said seeker group member;

obtaining a list of group members associated with said group;

querying contacts of said group members across multiple networks based on said requirement to obtain a plurality of matching target entities;

identifying a plurality of connected members who are already connected to said plurality of matching target entities;

communicating a search result to each of said connected members, wherein said search result comprises said plurality of matching target entities connected to said seeker group member;

receiving a response selected from an acceptance or a rejection from said plurality of connected members to refer said plurality of matching entities to said seeker group member;

communicating referrals from said plurality of connected members to said seeker group member only when said response is said acceptance and not when said response is said rejection; and communicating introductory messages for connecting said matching target entities and said seeker group member through said connected members.

\* \* \* \* \*